Patented July 27, 1954

2,684,953

UNITED STATES PATENT OFFICE 2,684,953

INTUMESCENT COATING COMPOSITION AND AN ARTICLE OF MANUFACTURE THEREOF

Elmer K. Stilbert, Jr., Ira J. Cummings, and William B. Guerrant, Midland, Mich., assignors to The Dow Chemical Company, Midland, Mich., a corporation of Delaware No Drawing. Application March 29, 1952, Serial No. 279,474

5 Claims. (Cl. 260—17.3)

This invention concerns an improved intumescent coating composition and a wall-member coated therewith.

Intumescent coating compositions have been applied in the past to combustible materials for protection against fire, some of which are disclosed in U. S. Patents 2,386,471, 2,452,054 and 2,523,626. Prior coatings have exhibited satisfactory fire-retardant properties but poor abrasion-resistant properties. Intumescent coatings deposited by available commercial compositions are removed when the coatings are washed, as they have virtually no resistance to scrubbing. When coatings, such as these, are employed as fire-retardants on cellulosic wall members, and attempts are made to keep such members clean by washing and scrubbing operations, it is found that the life-span of the coating is short. Such prior coatings have little flexibility, and are subject to cracking. A composition that deposits a coating, exhibiting both fire-retardant and abrasion resistant characteristics, is much to be desired.

It is an object of the invention to provide a composition whose deposited coating on combustible building materials, such as cellulosic wall and ceiling members (either lumber or fiber board) exhibits good fire-retardant and abrasion-resistant qualities and has substantial flexibility. Another object is to provide a coated and normally combustible building material, such as cellulosic fiber board, whose coating exhibits the qualities just stated. Other and related objects will become apparent as the description of the invention proceeds.

The above and related objects are accomplished by the following invention, in which a combustible building material is provided with an abrasion-resistant, intumescent coating deposited by a composition comprising a film-forming aqueous latex-like dispersion of a polymer, a resinous carbon-yielding substance, a non-resinous carbon-yielding substance and a foam-producing substance.

In the composition of the present invention, various resinous carbonifics may be employed. Mixtures of urea and a source of formaldehyde such as paraformaldehyde, hexamethylenetetramine or the like or a preformed urea-formaldehyde or melamine-formaldehyde resin may be used for the purpose. At higher temperatures of 140° C. or above, the resinous carbonific in combination with a spumific, forms a fire-resistant carbonaceous foam. The spumifics that may be employed are such compounds as monoammonium phosphate, diammonium phosphate, phosphoric acid, ammonium sulfate, sulfamic acid, ammonium sulfamate, ammonium bromide, sodium tungstate, sodium borate and boric acid. While a non-resinous carbonific is not entirely essential, a more coherent carbonaceous foam is obtained from a composition containing one. Materials suitable as non-resinous carbonifics are dextrin, carbohydrate gums, modified starches and similar substances, or a water-dispersible protein, such as gelatin or casein, a carbohydrate being preferred herein as the non-resinous carbonific.

The resinous carbonific is usually present in an amount between 20 and 70 per cent of the weight of the spumific or foam-forming ingredient, the formaldehyde being present in the resinous carbonific in a ratio between 1 and 2.5 moles per mole of urea. The non-resinous carbonific or carbohydrate is present in an amount not less than 5 per cent of the spumific. The combined weight of the carbohydrate, and the ureaformaldehyde constituents is not to exceed the weight of the spumific.

A polymer latex, usually of about 50 per cent solids, is to be incorporated in the new composition, in an amount to provide between 15 and 35 per cent of the latex solids based on the weight of the spumific. Any aqueous latex-like dispersion of a polymer, capable of forming films, is satisfactory for the purpose. Examples of polymeric materials which may be employed in preparing the new coating compositions are the polymer of vinyl acetate; copolymers of styrene and butadiene; copolymers of vinylidene chloride and acrylonitrile; and copolymers of vinylidene chloride and vinyl chloride; each such polymer or copolymer being supplied in a latex which is capable of forming films. As is known in the art, some polymer emulsions deposit continuous films of the unplasticized polymer, and others only do so if the polymer is plasticized.

An aqueous dispersion of a suitable polymer or copolymer is prepared by polymerizing the corresponding monomeric material in aqueous emulsion in accordance with known procedures. Usually, the polymerizable compounds, in relative proportions corresponding to the desired composition of the copolymeric product, are admixed with an aqueous solution of an emulsifying agent and the mixture is agitated to effect emulsification. A variety of suitable emulsifying agents, such as sodium oleate, sodium sulphate esters of higher alcohols and sodium sulphonates of alkylated naphthalenes, biphenyls, or other aromatics are known to the art. The emulsifying agent is usually employed in amount corresponding to from 0.5 to 5 per cent of the weight of the polymerizable organic compounds, but it may be used in smaller or larger proportions. A peroxide, such as hydrogen peroxide, potassium persulphate, or benzoyl peroxide, or other polymerization catalyst is usually added in amount corresponding to from 0.5 to 4 per cent of the weight of the compounds to be polymerized. The emulsion is heated in a closed container, usually at temperatures between 50° and 100° C. to effect polymerization. After completion of the polymerization, the resulting latex may be stirred with about 10 per cent by weight of a plasticizer, and there may be added advantageously a small amount of a low-viscosity methyl cellulose or other hydrophilic colloid for improved film formation in those particular polymer or copolymer latices that are not, of themselves, particularly good film-formers.

In preparing the new coating composition, various inert ingredients are initially mixed and ground together for several hours in a pebble mill, adding sufficient water to form a mixture of about 55 per cent solids content. The inert ingredients are those materials such as swelling agents, pigments, dyes, other coloring materials and fungicides or bactericides which may be desired in the coating for an effect such as color or mildewproofing, not associated with the flame-resistant characteristics of the coating. Examples of suitable swelling agents or dispersants are gum tragacanth, gum arabic, Irish moss and the like. Suitable well-known substances to counteract the fermentation of the carbohydrate and the growth of fungi are sodium pentachlorphenolate, beta-naphthol, copper fluoride or other copper salts, boric acid, borax, zinc salts, fluorides, arsenates, arsenites, and the like. To the pigment slip containing the inert ingredients may be added the spumific and the urea-formaldehyde resin or agents for forming such resin. The desired latex is finally added to the so-formed mixture and is stirred therein for a short time. A smooth, stable composition results.

The new coating composition, prepared in this manner, may be applied to any combustible building material to impart fire-retardant properties and to provide the material with a coating that is sufficiently resistant to abrasion to permit thorough washing without significant loss of the protective coating. The new composition may be applied by roller, brush or spray application. When the coating is applied at the mill where fiberboard is made, the coated article is usually dried by a heat treatment at a temperature of about 50° C. to 200° C. A coated board prepared in this manner is fire-retardant and its coating is substantially resistant to abrasion encountered in normal use or in washing operations, as is illustrated in the following examples.

Purely as exemplification of the present invention, and without any intention to limit the same to these specific embodiments, the following examples are given. In the table, the numerical values opposite each named constituent of the coating are given in relative parts by weight, dry basis. Each composition was applied to a fiber board surface, as later described and, after drying, was exposed to flame. Char area, degree of intumescence and other factors were noted. Other samples of the same coated boards were tested for permanence of coating when washed and scrubbed, as will be described, and the appearance of the board after such test is recorded.

*Table*

|  | (blank) I | II | III | (blank) IV | V | VI | (blank) VII | VIII |
|---|---|---|---|---|---|---|---|---|
| Monoammonium phosphate | 55.0 | 46.8 | 55.0 | 67 | 67 | 67 | 55.0 | 55.0 |
| Boric acid | 1.6 | 1.4 | 1.6 | 2 | 2 | 2 | 1.6 | 1.6 |
| Corn starch | 6.6 | 5.5 | 6.6 | 8 | 8 | 8 | 6.6 | 6.6 |
| Gum tragacanth | 0.8 | 0.7 | 0.8 | 1 | 1 | 1 | 0.8 | 0.8 |
| Titanium dioxide | 4.1 | 3.5 | 4.8 | 5 | 5 | 5 | 4.1 | 4.1 |
| Lithopone pigment | 8.2 | 7.0 | 8.2 | 10 | 10 | 10 | 8.2 | 8.2 |
| Mica |  |  |  | 20 | 20 | 20 |  |  |
| Urea | 9.0 | 7.6 | 9.0 | 11 | 10.2 | 10.2 | 9.0 | 9.0 |
| Paraformaldehyde | 14.7 | 12.5 | 14.7 | 18 | 16.8 | 16.8 | 14.7 | 14.7 |
| Plasticized latex copolymer (75 vinyl chloride-25 vinylidene chloride), solids |  | 15.0 |  |  |  |  |  |  |
| Latex copolymer (45 vinyl chloride-55 vinylidene chloride), solids |  |  | 14.7 |  |  |  |  |  |
| Latex copolymer (82 vinylidene chloride-18 acrylonitrile), solids |  |  |  |  | 15.5 |  |  |  |
| Plasticized latex polymer (vinyl acetate), solids |  |  |  |  |  | 15.5 |  |  |
| Latex copolymer (60 styrene-40 butadiene), solids |  |  |  |  |  |  |  | 14.7 |
| Scrub resistance No. of cycles | 20 | 600 | 600 | 8 | 100 | 100 | 20 | 100 |
| Surface condition after scrubbing* | 0 | 4-5 | 4-5 | 0 | 4-5 | 3 | 0 | 4 |
| Surface char area (in.²) | 8 | 9.5 | 8 | 11.5 | 12 | 12 | 11.5 | 11.5-12 |
| Degree of intumescence** | 4 | 4 | 4 | 3 | 1 | 3 | 4 | 2-3 |
| Lbs. of coating wt./1,000 ft.² | 40 | 40 | 40 | 30 | 30 | 30 | 30 | 30 |

*0=100% of board surface showing; 1=75-100% of board surface showing; 2=50-75% of board surface showing; 3=25-50% of board surface showing; 4=0-25% of board surface showing; 5=Completely covered with coating.
**0=No intumescence; 1=Very slight intumescence; 2=Fair intumescence; 3=Good intumescence; 4=Excellent intumescence.

All of the coating compositions made in accordance with the above eight examples have been given in tabular form so that they may be compared with each other. All of the compositions were prepared by grinding the inert ingredients, such as the boric acid, corn starch, gum tragacanth, titanium dioxide, and in some instances, mica, in a pebble mill for 3 hours with sufficient water to form a mixture of about 55 per cent solids content. To the resulting pigment slip containing the inert ingredients, urea and monoammonium phosphate were added with further grinding. Paraformaldehyde was added and mixing continued for a period of 20 to 30 minutes. Subsequently, the desired latex (plasticized when necessary) was added and mixed with the previously prepared mixture for a period of 10 minutes. In the blanks (Examples I, IV and VII), no film-forming aqueous polymer latex was added. Each of the eight compositions was sprayed evenly over the surfaces of 12-inch square panels (⅜ inch thick) of low density, previously uncoated fibrous wall-board. The coated panels were dried at 158° F. for 10 minutes, followed by a 5 minute period at 302° F. The dry coated panels were then aged 16 to 20 hours at 75° F. and 50% relative humidity. These panels were then exposed to the fire test to determine the degree of intumescence and the area of surface char of each coating. The first test consisted of exposing the coated surface of a panel, inclined at an angle of 45 degrees, to the complete burning of 1 cubic centimeter of absolute alcohol, the alcohol flame being focused on the board at a point about 2 inches above the lower end of the panel. This fire test is described in Commercial Standard CS-42-49, U. S. Department of Commerce Bulletin, "Structural Fiber Insulating Board" (4th Ed.). The amount of protection that each coating composition provides for each panel is rated according to the amount of intumescence and according to the area of surface char. Maximum fire-retardant qualities are shown by those coatings which provide excellent intumescence (maximum depth of foam after exposure to flame) minimum area of surface char.

A 4 inch by 12 inch strip was cut from the uncharred portion of each of the coated panels and these were tested for abrasion resistance, according to Federal Specification TT-P-38a using a 0.5% soap solution and 100 oscillations of the scrubbers. The "Gardner Straight Line Scrub Tester—Model 105" (obtained from Gardner Laboratory Inc., Bethesda, Maryland) was used in the standard scrub test. At the end of 100 oscillations (200 strokes) of scrubbing, a panel whose surface is still completely covered with coating, is one that exhibits maximum resistance to abrasion. A coated panel that exhibits minimum resistance to abrasion, is one whose board surface is completely exposed and the fire-retardant coating is completely removed after 100 cycles under the Gardner Scrub Tester.

The results tabulated above show that compositions of Examples II and III containing a vinyl chloride-vinylidene chloride copolymer latex exhibit the same degree of intumescence (good) and about the same area of surface char (8 to 9.5 square inches) as the blank Example I containing no latex in its composition. However, the coating composition containing the latex is vastly superior in abrasion resistance to that of the blank. An insignificant amount of wear of the coatings on the panels was noted in Example II and III. On the other hand, the coating on the panel of the blank (Example I) was completely removed after being exposed to only 20 oscillations (40 strokes) of the Gardner Scrub Tester. The difference in the abrasion resistance of the blank and of Examples II and III is too large to be either predicted or expected. Similarly, the abrasion resistance exhibited by the coating compositions of Examples V and VI is considerably greater than that of their corresponding blank Example IV. Likewise, the abrasion resistance noted in Example VIII is vastly superior to its corresponding blank shown in Example VII.

It is observed that the coating composition of the present invention exhibits outstanding utility as a protective coating for normally combustible building materials such as the fiber boards that are used as the inner walls and ceilings in prefabricated buildings. The improved article is a flame retardant and these qualities are retained when the coated article is cleaned by soap and water scrubbing.

We claim:

1. An intumescent coating composition comprising urea, a source of formaldehyde, a hydrophilic carbohydrate, a film forming aqueous latex-like dispersion of a copolymer of vinylidene chloride and vinyl chloride, and a foam-forming ingredient selected from the group consisting of monoammonium phosphate, diammonium phosphate, phosphoric acid, ammonium sulphate, sulfamic acid, ammonium sulfamate, ammonium bromide, sodium tungstate, sodium borate and boric acid, the formaldehyde available from said source being present in a ratio between 1 and 2.5 moles per mole of urea, the urea and formaldehyde available from said source being present in the amount between 20 and 70 per cent of the weight of the foam-forming ingredient, the carbohydrate being present in an amount not less than 5 per cent of the foam forming ingredient, the latex solids being present in the amount between 15 and 35 per cent of the weight of the foam-forming ingredient, and the combined weight of the carbohydrate, the urea and the formaldehyde available from said source not exceeding the weight of the foam-forming ingredient.

2. The composition as claimed in claim 1 wherein the latex is one of about 50 per cent solids.

3. As an article of manufacture, a normally combustible building material coated with the composition claimed in claim 1 to render the article fire retardant and abrasion resistant.

4. A cellulosic building material coated with the composition claimed in claim 1.

5. A fibre-board coated with the composition claimed in claim 1.

References Cited in the file of this patent

UNITED STATES PATENTS

| Number | Name | Date |
|---|---|---|
| 2,452,054 | Jones | Oct. 26, 1948 |
| 2,600,455 | Wilson | June 17, 1952 |

OTHER REFERENCES

Burr, Official Digest, vol. 304, pages 347–358, May 1950.

Henson, Official Digest, vol. 316, pages 298–300, May 1951.